(12) United States Patent
McCormack

(10) Patent No.: US 8,139,113 B2
(45) Date of Patent: Mar. 20, 2012

(54) METHOD AND SYSTEM FOR OPERATING A CAMERA ASSEMBLY

(75) Inventor: Kenneth McCormack, Albany, OR (US)

(73) Assignee: UTC Fire & Security Americas Corporation, Inc., Bradenton, FL (US)

(*) Notice: Subject to any disclaimer, the term of this patent is extended or adjusted under 35 U.S.C. 154(b) by 1118 days.

(21) Appl. No.: 11/964,393

(22) Filed: Dec. 26, 2007

(65) Prior Publication Data

US 2009/0167858 A1    Jul. 2, 2009

(51) Int. Cl.
*H04N 7/18*    (2006.01)
(52) U.S. Cl. ............ 348/143; 396/52; 396/55; 318/561; 318/602; 318/611; 318/623
(58) Field of Classification Search .................. 348/143; 396/52, 55; 318/561, 602, 611, 623
See application file for complete search history.

(56) References Cited

U.S. PATENT DOCUMENTS

| | | | | |
|---|---|---|---|---|
| 5,298,933 | A * | 3/1994 | Chigira | 396/82 |
| 6,191,842 | B1 * | 2/2001 | Navarro | 352/38 |
| 6,624,607 | B1 * | 9/2003 | Ellerthorpe et al. | 318/623 |
| 7,187,142 | B2 | 3/2007 | Rehm | |
| 2004/0263681 | A1 | 12/2004 | Teramoto et al. | |
| 2005/0057209 | A1 * | 3/2005 | Andoh et al. | 318/696 |
| 2005/0120444 | A1 * | 6/2005 | Takenaka | 901/16 |
| 2005/0254805 | A1 * | 11/2005 | Moriya et al. | 396/53 |
| 2006/0228097 | A1 * | 10/2006 | Higurashi | 396/55 |
| 2007/0046245 | A1 * | 3/2007 | Fujinaka et al. | 318/685 |
| 2007/0146488 | A1 * | 6/2007 | Higurashi et al. | 348/208.3 |
| 2007/0171987 | A1 * | 7/2007 | Trimeche | 375/240.27 |
| 2011/0026913 | A1 * | 2/2011 | Dumm | 396/428 |
| 2011/0057941 | A1 * | 3/2011 | Dengler et al. | 345/545 |

FOREIGN PATENT DOCUMENTS

JP    10009367 A    1/1998

OTHER PUBLICATIONS

Patent Cooperation Treaty, International Search Report for Application No. US2008/084134, Dec. 13, 2009, 3 pages.

* cited by examiner

*Primary Examiner* — Glenton B Burgess
*Assistant Examiner* — Oleg Survillo
(74) *Attorney, Agent, or Firm* — MH2 Technology Law Group LLP

(57) ABSTRACT

A method and a system for video camera assembly are provided. The video camera assembly includes at least one of a pan mechanism rotatable about a pan axis and a tilt mechanism rotatable about a tilt axis. The pan mechanism includes a pan motor and a pan position encoder. The tilt mechanism includes a tilt motor and a tilt position encoder. A controller is communicatively coupled to at least one of the pan mechanism and the tilt mechanism and is configured to apply a filter to a power drive signal of at least one of the pan motor and the tilt motor based on a determined corresponding rotational speed of the at least one of the pan motor and the tilt motor with the effect of reducing steady state vibrations which degrade the visual and audible qualities of said video camera assembly.

20 Claims, 3 Drawing Sheets

METHOD AND SYSTEM FOR OPERATING A CAMERA ASSEMBLY

BACKGROUND OF THE DISCLOSURE

This disclosure relates generally to video surveillance systems and, more particularly, to reducing oscillations in video images and audible noise from video camera assemblies which contain motors.

At least some known video surveillance systems include one or more video camera assemblies that typically include a video camera mounted in a housing along with a pan, tilt, and zoom (PTZ) assembly. The PTZ permits controlling a movement of the camera to align a viewing area of the camera with an object of interest or location of interest. The zoom portion of the mechanism may be used to adjust a field of view of the camera. The housing protects the camera from the environment in the location where the camera and PTZ assembly are mounted.

Video camera assemblies such as security cameras are installed in various manners. The PTZ assemblies generally include a motor for positioning the video camera about an axis of rotation and an angular position encoder for determining the position of the camera along the respective axis of rotation. In video camera assemblies that use closed loop position control, the encoder output is used to determine whether the camera is pointed at the commanded angle. If not, a motor drive signal is transmitted to the motor to drive the camera to the commended position. In some known video camera assemblies, the angular resolution of the encoder is greater than the angular resolution of the motor. In such assemblies, it is possible that the camera may be commanded to a position that is between positions that the motor can maintain in steady state. In such an instance, the motor may oscillate between two positions in an attempt to position the camera to the commanded angle. Such oscillation causes the motor windings to vibrate such that an undesirable audible noise is generated.

BRIEF DESCRIPTION OF THE DISCLOSURE

In one embodiment, a video camera assembly includes at least one of a pan mechanism rotatable about a pan axis and a tilt mechanism rotatable about a tilt axis. The pan mechanism includes a pan motor and a pan position encoder. The tilt mechanism includes a tilt motor and a tilt position encoder. A controller is communicatively coupled to at least one of the pan mechanism and the tilt mechanism and is configured to apply a filter to a power signal of at least one of the pan motor and the tilt motor based on a determined corresponding rotational speed of the at least one of the pan motor and the tilt motor.

In another embodiment, a method of operating a video camera assembly that includes at least one of a pan mechanism and a tilt mechanism is provided. The pan mechanism includes a pan motor and a pan axis encoder and the tilt mechanism includes a tilt motor and a tilt axis encoder. The method includes determining a rotational speed of at least one of the pan mechanism and the tilt mechanism, and applying a filter to a power driver of at least one of the pan motor and the tilt motor when the rotational speed of a corresponding at least one of the pan mechanism and the tilt mechanism exceeds a first predetermined threshold.

In yet another embodiment, a video system includes a video camera assembly including a video camera and at least one of a pan mechanism and a tilt mechanism. The pan mechanism including a pan motor and a pan position encoder, the tilt mechanism including a tilt motor and a tilt position encoder. A controller is communicatively coupled to the video camera assembly. The controller is configured to analyze position information from at least one of the pan position encoder and the tilt position encoder, determine at least one of an oscillation and an audible noise of the video camera assembly using the analyzed information, generate at least one of a pan motor power signal and a tilt motor power signal using the analyzed information, and apply the at least one of a pan motor power signal and a tilt motor power signal to a respective motor such that at least one of the oscillation and the audible noise of the video camera assembly is facilitated being reduced.

DETAILED DESCRIPTION OF THE DISCLOSURE

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, reducing audible noise generated in a video camera assembly and/or reducing oscillation in video images generated by the video camera assembly. However, it is contemplated that this disclosure has general application to reducing oscillation and audible noise in other equipment driven by motors and actuators in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Figure 1:
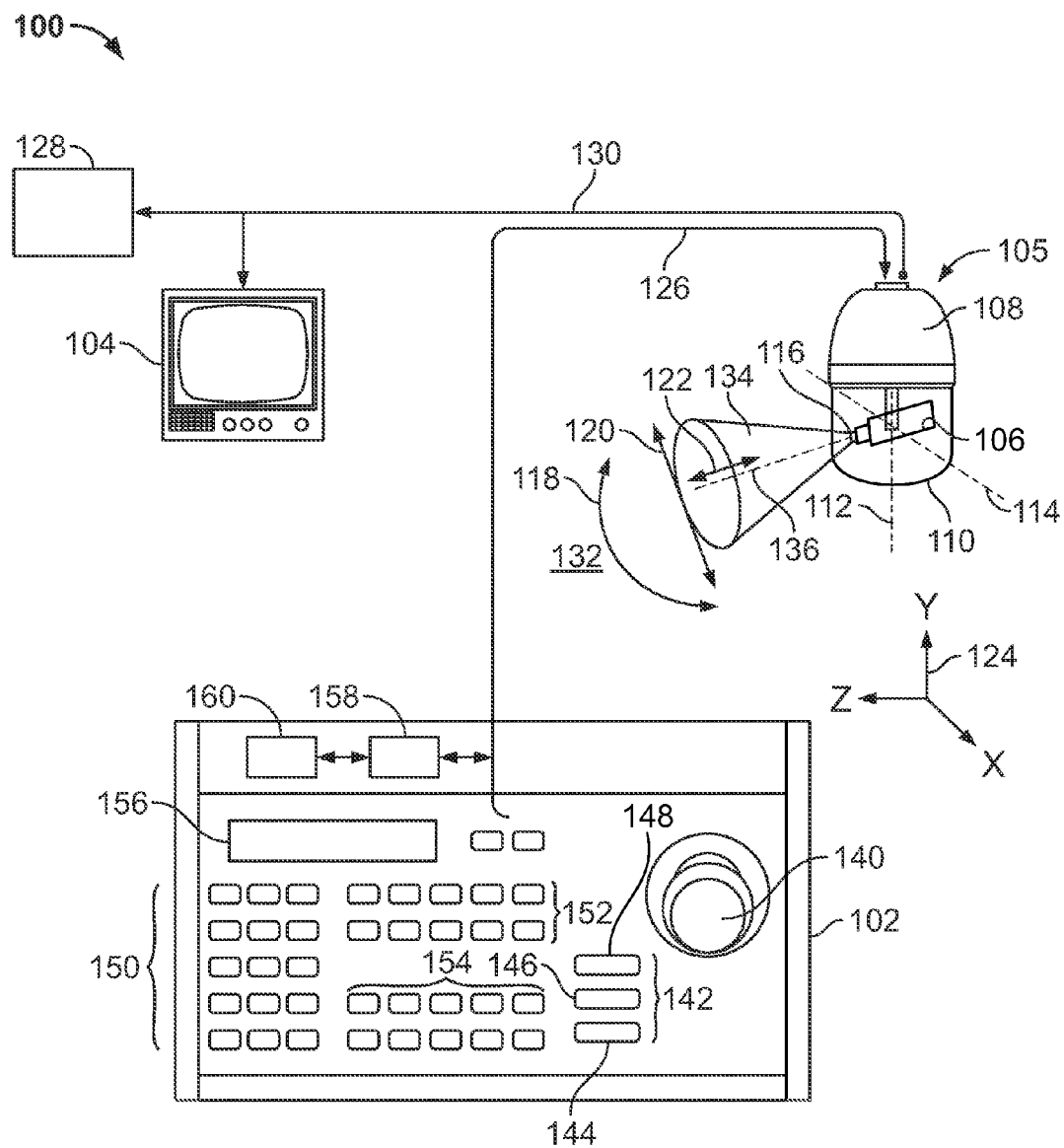
FIG. 1 is a schematic view of an exemplary video surveillance system in accordance with an embodiment of the present disclosure.

FIG. 1 is a schematic view of an exemplary video surveillance system 100 in accordance with an embodiment of the present disclosure. Video surveillance system 100 includes a controller 102, a display monitor 104, and a video camera assembly 105. Typically, a camera 106 is housed in an enclosure 108 having a dome 110 for protecting camera 106 from the environment where camera 106 is located. In one embodiment, dome 110 is tinted to allow camera 106 to acquire images of the environment outside of enclosure 108 and simultaneously prevent individuals in the environment being observed by camera 106 from determining the orientation of camera 106. In various alternative embodiments, dome 110 is not tinted. In the exemplary embodiment, camera 106 includes capabilities to pan about a vertical axis 112, tilt about a tilt axis 114, and control a lens assembly 116 to cause camera 106 to zoom. For example, video camera assembly 105 includes a pan mechanism 113 including a pan motor and encoder and a tilt mechanism 115 including a tilt motor and encoder. The encoders determine an angular position of the associated pan or tilt motor to generate position signals that are used with a zoom setting to determine an area in the field of view. Panning movement of camera 106 is represented by an arrow 118, tilting movement of camera 106 is represented by arrow 120 and the changing of the focal length of lens assembly 116 of camera 106, i.e., zooming, is represented by arrow 122. As shown with reference to a coordinate system 124, panning motion may track movement along the x-axis, tilting motion may track movement along the y-axis, and focal length adjustment may be used to track movement along the z-axis. Signals representing commands to control such capabilities are transmitted from controller 102 through a control/data line 126. Image data signals are transmitted from camera 106 to display monitor 104, a storage device 128, and to controller 102 through a video or data network 130. In an alternative embodiment, image data signals are transmitted from camera 106 to controller 102 through control/data line 126.

Lens assembly 116 views an area of a location 132, which may be remote from controller 102 and is in a field of view 134 and along a viewing axis 136 of lens assembly 116. Images of location 132 are converted by camera 106 into an electrical video signal, which is transmitted to display monitor 104.

In the exemplary embodiment, controller 102 includes an X-Y control joystick 140 that is used to generate pan and tilt commands. A plurality of rocker-type switches 142 are used to control a zoom 144, a focus 146, and an iris 148 of lens assembly 116. In an alternative embodiment, joystick 140 includes a twist actuation that is used to control the zoom of camera 106. Joystick 140 may also incorporate triggers and/or buttons to facilitate operating various controls associated with system 100. Controller 102 also includes a numeric keypad 150 for entering numbers and values. In an alternative embodiment, controller 102 may include an alpha or alphanumeric keypad (not shown) for entering text as well as numbers. Controller 102 further includes a plurality of preset switches 152 that may be programmed to execute macros that automatically control the actions of camera 106 and/or lens assembly 116. A plurality of buttons 154 may be used, for example, for predetermined control functions and/or user-defined functions, for example, a camera selection in a multi-camera video surveillance system. A display 156 may be used to display a status of video surveillance system 100 or may be used to display parameters associated with a selected camera.

A processor 158 receives programmed instructions, from software, firmware, and data from memory 160 and performs various operations using the data and instructions. Processor 158 may include an arithmetic logic unit (ALU) that performs arithmetic and logical operations and a control unit that extracts instructions from memory 160 and decodes and executes them, calling on the ALU when necessary. Memory 160 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). In addition, memory 160 may include an operating system, which executes on processor 158. The operating system performs basic tasks that include recognizing input, sending output to output devices, keeping track of files and directories and controlling various peripheral devices.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. Memory 160 may include storage locations for the preset macro instructions that may be accessible using one of the plurality of preset switches 142.

As used herein, the terms "software" and "firmware" are interchangeable, and include any computer program stored in memory for execution by processor 158, including RAM memory, ROM memory, EPROM memory, EEPROM memory, and non-volatile RAM (NVRAM) memory. The above memory types are exemplary only, and are thus not limiting as to the types of memory usable for storage of a computer program.

In various embodiments, processor 158 and memory 160 are located external to camera 106 such as in controller 102 or in a PC or other standalone or mainframe computer system capable of performing the functions described herein.

In the exemplary embodiment, video surveillance system 100 is a single camera application, however, various embodiments of the present disclosure may be used within a larger surveillance system having additional cameras which may be either stationary or moveable cameras or some combination thereof to provide coverage of a larger or more complex surveillance area. In an alternative embodiment, one or more video recorders (not shown) are connected to controller 102 to provide for recording of video images captured by camera 106 and other cameras in system 100.

Figure 2:
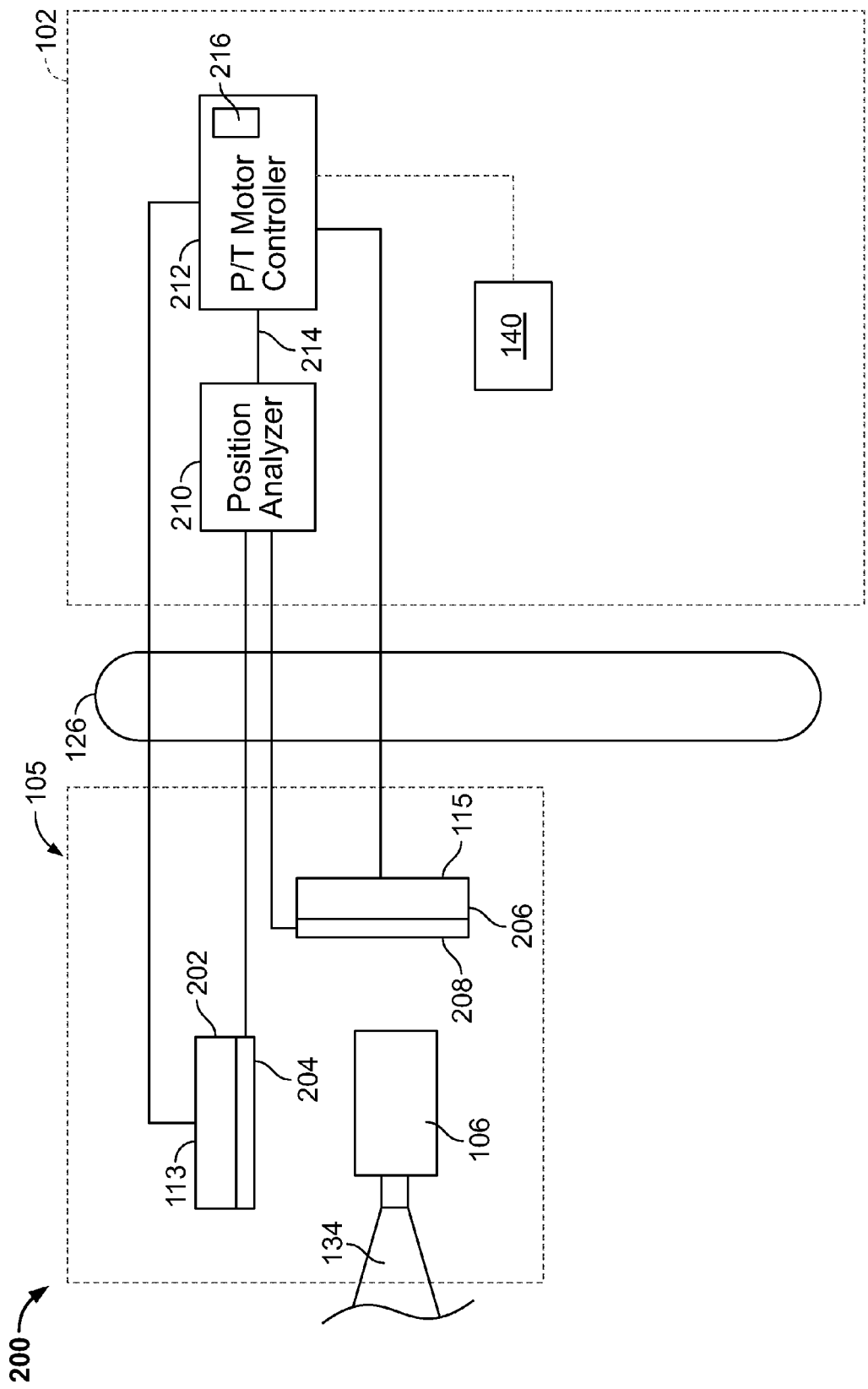
FIG. 2 is a schematic view of a portion of video surveillance system in accordance with an embodiment of the present disclosure.

FIG. 2 is a schematic view of a portion 200 of video surveillance system 100 in accordance with an embodiment of the present disclosure. In the exemplary embodiment, video surveillance system 100 includes video camera assembly 105, pan mechanism 113, and tilt mechanism 115 communicatively coupled to controller 102 through control/data line 126. Pan mechanism 113 includes a pan motor 202 and a pan position encoder 204. Tilt mechanism 115 includes a tilt motor 206 and a tilt position encoder 208. Camera 106 is mechanically coupled to pan mechanism 113 and tilt mechanism 115 such that controller 102 can generate and transmit control signals to pan motor 202 and tilt mechanism 115 to control field of view 134 of camera 106.

A position analyzer 210 is communicatively coupled to encoders 204 and 208 and is configured to receive signals relative to the angular position of encoders 204 and 208. Position analyzer 210 is further configured to transmit signals relative to the angular position of encoders 204 and 208 to a pan/tilt motor controller 212 through position feedback line 214. Pan/tilt motor controller 212 combines the feedback signals from position analyzer 210 with a motor position command signal from a position selector, such as joystick 140.

During operation, joystick 140 is manipulated by a user to generate commands to move pan motor 202 and tilt motor 206 to a desired position such that an object of interest is within field of view 134. In an alternative embodiment, pan motor 202 and tilt motor 206 are positioned via automatically generated signals. When the pan and/or tilt motors 202, 206 are positioned at the commanded position based on an output from encoders 204 and/or 208, pan and/or tilt motors 202, 206 attempt to hold video camera assembly 105 at the commanded position. When the speed of motion of video camera assembly 105 decreases below a predetermined threshold a filter 216 is switched into the command circuitry controlling pan motor 202 and tilt motor 206. Position analyzer 210 receives position signals from encoders 204 and/or 208 and determines a speed of video camera assembly 105 in each axis based on a change in received position signals. As such filter 216 is enabled only in a steady state condition and is switched out of the motor drive circuit when the motor speed exceeds a predetermined cutout speed.

In the exemplary embodiment, filter 216 comprises a velocity driven adaptive filter to reduce an oscillation and/or audible noise generated by pan motor 202 and tilt motor 206. Such noise may be due to two factors, a natural frequency response of the installation coupled with an offset weight of the tilt/pan mechanism and a high gain on the proportional section of a Proportional-Integral-Differential (PID) control of filter 216 to account for a non-linearity of pan motor 202 and tilt motor 206 across poles of the stepper-type motors.

The oscillations at steady state are removed by an adaptive least mean squares (LMS) finite impulse response (FIR) filter that is enabled only when at steady state. Steady state is determined by evaluation of the motor velocity and applying a threshold with hysteresis.

The proportional gain of the PID control can be a source of oscillations if set too high as well. A relatively high value of proportional gain is used to linearize the micro stepping of the motor across poles. A lower value of the proportional gain can be achieved by mapping the non-linearity of the motor torque versus drive capability and adjusting the control value of the PID across poles. This effectively allows the controller to predict the non-linearity and compensate in an intelligent manner rather than blindly with the gain.

A look-up table is generated that stores the applied torque versus the angular rotation achieved for each of the numerous poles of the motor. The applied current to the motor is proportional to the torque and this is used as a measure for torque. The velocity achieved per unit of torque is measured by examination of the differential encoder data from sensors 204/208. Thus the table built up includes one axis for the velocity (the velocity affects the distortion) and another axis for the distance between poles. These two axes would produce a continuous surface map of the non-linearity of the motor, which would be referenced when calculating the next control value.

In the exemplary embodiment, filter 216 comprises a least mean squares (LMS) algorithm in an adaptive filter to find the filter coefficients that relate to producing the least mean squares of an error signal wherein the error signal represents a difference between the commanded position and the actual position of video camera assembly 105. The parameters that define filter 216 may include one or more of an adaptation rate, a length, a decimation rate, a velocity, a threshold, a position history, and a time window. The parameters, in one embodiment, are determined and applied in a controlled environment such as a factory or shop based on empirical data acquired during a calibration procedure. In another embodiment, the parameters are dynamically determined during operation of video camera assembly 105. An initial set of parameters may be determined during fabrication and those parameters may be modified automatically during operation based on environmental conditions. The initial set of parameters may be set to facilitate compensating for inconsistent manufacturing tolerances. During operation filter 216 adjusts to the nonlinear portion of the motor, permitting control of the oscillation.

Figure 3:
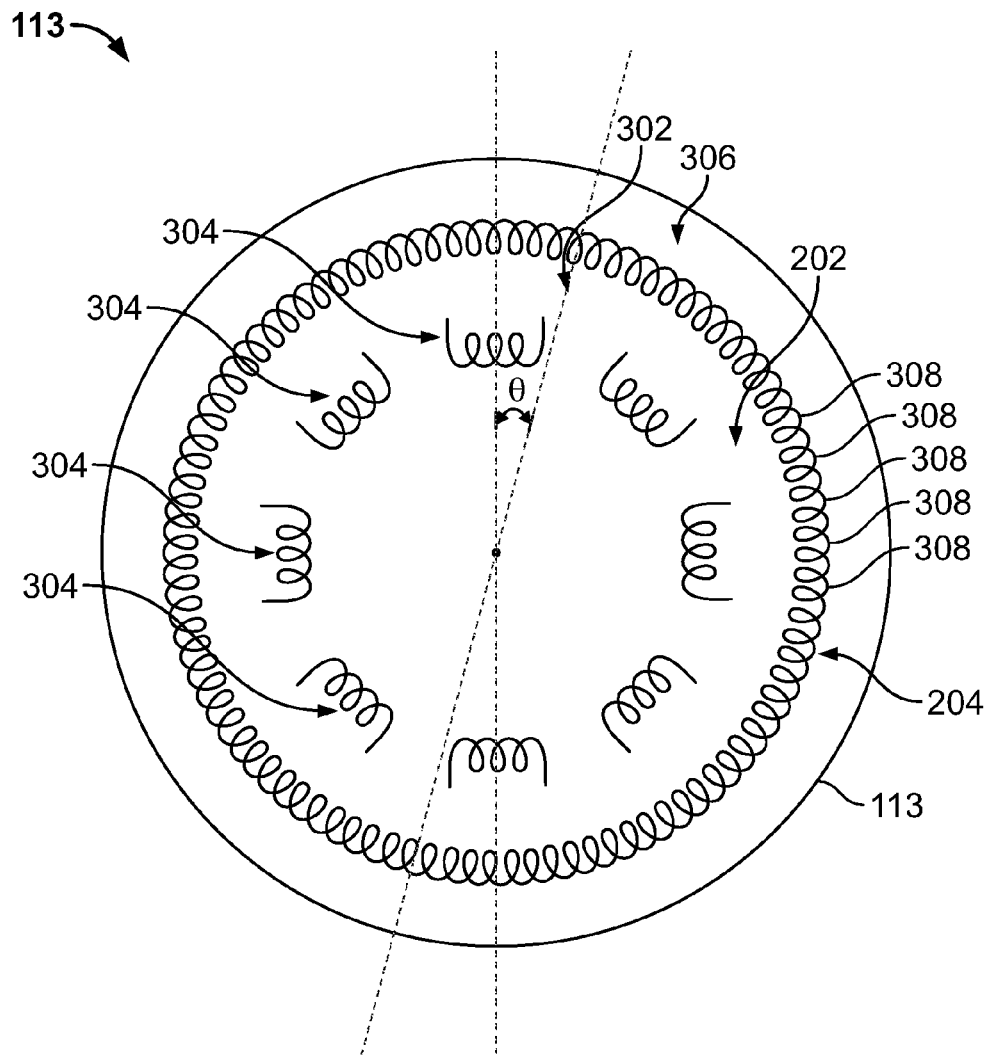
FIG. 3 is a schematic representation of the pan mechanism shown in FIG. 2 including the pan motor and encoder or the tilt mechanism including the tilt motor and encoder.

FIG. 3 is a schematic representation of pan mechanism 113 including pan motor 202 and encoder 204 or tilt mechanism 115 including tilt motor 206 and encoder 208. In the exemplary embodiment, tilt motor 206 includes windings 302 that include a plurality of poles 304. Tilt encoder 208 includes a method of resolving angular position that similarly includes a finite number of positions 308. Due to differences in construction, encoder 208 includes a significantly greater number of positions 308 than the number of poles 304 in motor 206. The resolvable discrete positions of encoder 208 is significantly greater than the positioning capability of motor 206. In the exemplary embodiment, an angular difference θ may be defined between a pole of motor 202 or 206 and a position of encoders 204 or 208. In many instances of commanding motor 206 to a specific position, the commanded position may lie between poles of motor 206. In a steady state condition, controller 102 attempts to maintain a rotor (not shown) of motor 206 in a position that corresponds to an addressable position of encoder 208. However, because the resolution of encoder 208 and motor 206 are different motor 206 will continue to be commanded to a position between poles, which it cannot achieve in a steady state condition. Controller 102 achieves this position only on the average by moving the rotor between addressable motor positions. The sequential moving of the rotor to the commanded position and drift of the rotor away from the commanded position and toward a pole 304 may cause a visual oscillation of the image display and may cause an audible noise within the motor as the video camera assembly 105 hunts around the commanded position at a high rate. Filter 216, in accordance with various embodiments of the present disclosure, is switched into the drive circuit of motor 206 to counter the tendency of motor 206 to oscillate between the commanded position using encoder 208 and the steady state position of motor 206.

As will be appreciated based on the foregoing specification, the above-described embodiments of the disclosure may be implemented using computer programming or engineering techniques including computer software, firmware, hardware or any combination or subset thereof, wherein the technical effect is to adaptively filter the steady state oscillation characteristics of a video camera assembly and to generate a control algorithm of the filter that reduces the steady state oscillation and audible noise caused by resolution differences between a motor and encoder components of the video camera assembly. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a video surveillance system provide a cost-effective and reliable means for adaptively filtering the power driver of a pan and/or tilt motor of a video camera assembly to facilitate minimizing visual oscillation and/or audible noise. More specifically, the methods and systems described herein facilitate determining a lookup table that identifies linearizing parameters for a pan and/or tilt motor of a video camera assembly. In addition, the above-described methods and systems facilitate detecting an oscillatory response of the video camera assembly during a steady state operation of the video camera assembly. As a result, the methods and systems described herein facilitate automatically reducing noise in a video camera assembly in a cost-effective and reliable manner.

Exemplary embodiments of video surveillance systems, methods, and apparatus are described above in detail. The video surveillance system components illustrated are not limited to the specific embodiments described herein, but rather, components of each system may be utilized independently and separately from other components described herein. For example, the video surveillance system components described above may also be used in combination with different video surveillance system components.

While the disclosure has been described in terms of various specific embodiments, it will be recognized that the disclosure can be practiced with modification within the spirit and scope of the claims.

What is claimed is:

1. A video camera assembly comprising:
a rotational drive mechanism rotatable about an axis, said rotational drive mechanism comprising a motor and a drive position encoder; and
a controller communicatively coupled to the rotational drive mechanism, said controller configured to apply an adaptive filter to a drive power signal of the motor in response to a rotational speed of the rotational drive mechanism falling below a first predetermined threshold when an actual position determined by the drive encoder is near a commanded position;
wherein the adaptive filter adjusts the drive power signal based on an error between the commanded position and the actual position, to counter a tendency of the motor to oscillate when near the commanded position.

2. An assembly in accordance with claim 1, wherein, said controller is configured to remove the adaptive filter when the determined rotational speed increases above a second predetermined threshold.

3. An assembly in accordance with claim 1, wherein, said controller is configured to:
analyze position information from the position encoder; and
determine the rotational speed of the rotational drive mechanism using the analyzed position information.

4. An assembly in accordance with claim 3, wherein, said controller is configured to:
determine at least one of an oscillation of the rotational drive mechanism and an audible noise generated by the rotational drive; and
apply the adaptive filter to the drive power signal of the motor using the determined rotational speed; and
modify parameters of the adaptive filter using at least one of the determined oscillation and the determined audible noise.

5. An assembly in accordance with claim 1, wherein said controller is configured to determine an oscillation of the rotational drive mechanism and an audible noise generated by the rotational drive mechanism.

6. An assembly in accordance with claim 5, wherein, said controller is configured to:
analyze position information from the position encoder; and
determine at least one of the oscillation and the audible noise using the analyzed position information.

7. An assembly in accordance with claim 1, wherein said controller is configured to automatically modify at least one operational parameter of the adaptive filter based on an output of the position encoder.

8. An assembly in accordance with claim 7, wherein said controller is configured to automatically modify at least one of an adaptation rate, a length, a decimation rate, a velocity, a threshold, a position history, and a time window of the adaptive filter.

9. An assembly in accordance with claim 1, wherein the adaptive filter comprises a least mean squares algorithm.

10. An assembly in accordance with claim 1, wherein, the adaptive filter comprises a finite impulse response algorithm.

11. An assembly in accordance with claim 1, wherein, the adaptive filter comprises a proportional-integral-differential control algorithm.

12. An assembly in accordance with claim 1, wherein, said controller comprises a position analyzer configured to:
receive position information from the position encoder; and
determine the rotational speed of the motor using the received position information.

13. A method of operating a video camera assembly that includes at least one of a pan mechanism and a tilt mechanism, the pan mechanism includes a pan motor and a pan axis encoder and the tilt mechanism includes a tilt motor and a tilt axis encoder, said method comprising:
determining a rotational speed of at least one of the pan mechanism and the tilt mechanism; and
filtering a drive power signal of at least one of the pan motor and the tilt motor with an adaptive filter in response to a rotational speed of the corresponding pan mechanism or tilt mechanism falling below a first predetermined threshold when an actual position determined by the corresponding pan encoder or tilt encoder is near a commanded position, the adaptive filter configured to adjust the drive power signal based on an error between the commanded position and the actual position to counter a tendency of the corresponding pan motor or tilt motor to oscillate when near the commanded position.

14. A method in accordance with claim 13, further comprising removing the effects of the adaptive filter on the drive power signal when the rotational speed of a corresponding at least one of the pan mechanism and the tilt mechanism exceeds a second predetermined threshold.

15. A method in accordance with claim 14, wherein the second predetermined threshold includes an offset for hysteresis with respect to the first predetermined threshold.

16. A method in accordance with claim 13, further comprising:
determining at least one of an oscillation of at least one of the pan mechanism and the tilt mechanism and an audible noise generated by at least one of the pan mechanism and the tilt mechanism;
determining at least one parameter of the adaptive filter that defines an operation of the adaptive filter that tends to oppose the at least one of determined oscillation; and the determined audible noise; and
applying the determined parameter to the adaptive filter such that the at least one of the oscillation and the audible noise is facilitated being reduced.

17. A video system comprising:
a video camera assembly including a video camera and at least one of a pan mechanism and a tilt mechanism, said pan mechanism comprising a pan motor and a pan position encoder, said tilt mechanism comprising a tilt motor and a tilt position encoder; and
a controller communicatively coupled to said video camera assembly, said controller is configured to:
analyze position information from at least one of said pan position encoder and said tilt position encoder;
determine at least one of an oscillation and an audible noise of said video camera assembly using the analyzed position information;
generate at least one of a pan motor drive power signal and a tilt motor drive power signal using the analyzed position information;

apply an adaptive filter based on an error between a commanded position and an actual position determined by the pan encoder or the tilt encoder, to at least one of the pan motor drive power signal and the tilt motor drive power signal in response to a rotational speed of the corresponding pan mechanism or tilt mechanism falling below a first predetermined threshold when the actual position is near the commanded position; and apply the at least one of the pan motor drive power signal and the tilt motor drive power signal to a respective motor such that at least one of the oscillation and the audible noise of said video camera assembly is reduced when the corresponding pan mechanism or tilt mechanism is near the commanded position.

18. A system in accordance with claim 17, wherein, said controller is further configured to remove the effects of the adaptive filter when the associated rotational speed increases above a predetermined threshold.

19. The video camera assembly of claim 1, wherein the rotational drive mechanism is a pan mechanism rotatable about a pan axis, the motor is a pan motor, and the position encoder is a pan position encoder.

20. The video camera assembly of claim 1, wherein the rotational drive mechanism is a tilt mechanism rotatable about a tilt axis, the motor is a tilt motor, and the position encoder is a tilt position encoder.

* * * * *